INVENTOR.
ERNEST S. NOSSEN
BY
his ATTORNEY

United States Patent Office 2,737,441
Patented Mar. 6, 1956

2,737,441

SEPARATION OF MANGANESE FROM IRON AND OTHER UNDESIRABLE ORE COMPONENTS

Ernest Samuel Nossen, Paterson, N. J.

Application December 5, 1950, Serial No. 199,181

7 Claims. (Cl. 23—87)

This invention relates to the treatment of ores, and more particularly, to processes for the separation of manganese from iron and other undesirable ore components.

In many ores, manganese is combined with iron and impurities such as silica, and alkaline earth metal oxides. These ores, however, quite often are not marketable for the reason that the iron content is considerably lower than 50%, the silica content is too high (20–30%), and the manganese content (about 10%) is too high for iron ores, and too low for manganese ores. In practice it has been found that these ores, available in large deposits, cannot be made useable by physical beneficiation alone, since the components are linked together too intimately.

An object of the present invention is to provide a process by means of which ores containing less than 50% iron and approximately 10% manganese may be made usable in an economic way.

Another object of the present invention is to provide a process for an economical separation of manganese from iron and other undesirable minerals contained in an ore.

A further object of the present invention is to provide a process for separating manganese as well as iron from other undesirable minerals of ores containing manganese and iron in such a manner that two marketable products are obtained, i. e., first, a high grade manganese compound, and second, a product containing more than 50% iron.

Another object of the present invention is to provide an apparatus for decomposition of a manganese nitrate solution into manganese dioxide and nitric acid.

Other objects and advantages of the invention will be apparent from the following description.

Figure 1:
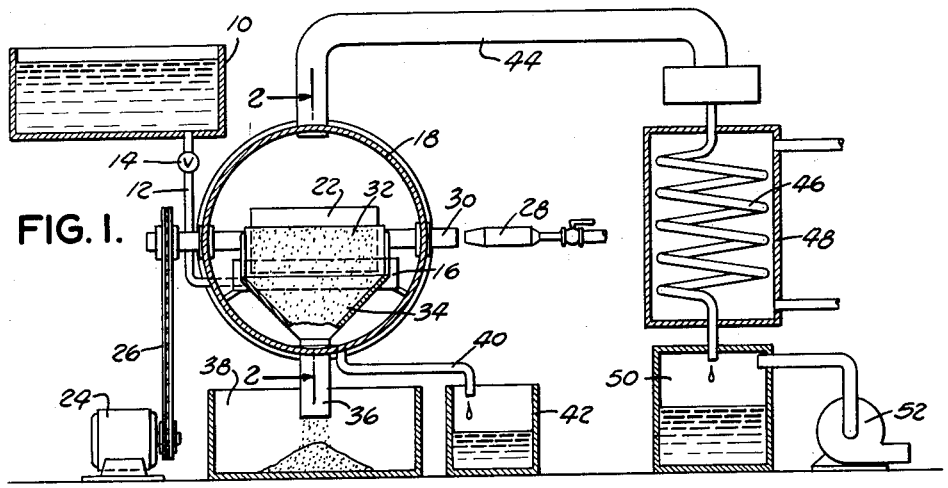
Fig. 1 is a view, partly in section, of an apparatus for the decomposition of a manganese nitrate solution.

The ore to be treated is crushed and finely ground to 60–100 mesh. Thereupon, the ore is incompletely reduced in a reducing atmosphere in such a way that the manganese oxides thus formed are composed of $Mn_2O_3$ and MnO, and that the iron oxide becomes $Fe_3O_4$. This result of incomplete reduction depends on the time of reaction, the temperature, the reducing agent, and the specific properties of the ore. The temperature range is between 300° C. and 700° C.; the temperature to be chosen depends on the characteristics of the ore, and on the reducing agent used in the process, for example, city-gas, natural gas, butane gas, water gas, charcoal, carbon, oil, etc. It is understood that the "incomplete" reduction set forth above, is in contrast to a "complete" reduction, in which latter the reduction is continued until the manganese is reduced to MnO whereby at least a portion of the iron is also reduced farther than to $Fe_3O_4$.

The reduced product, according to the invention, still showing a small amount of $MnO_2$ in the analysis, is leached with an acid, for example nitric acid, sulfuric acid, hydrochloric acid, or an acid salt solution containing one of the forementioned acids and a manganese salt, so as to extract a greater part of the manganese due to its solubility in acid, or in salt solution acid. The iron and phosphorus which may be present in the ore remain in the insoluble remainder. Due to the preceding incomplete reduction of the ore, the iron, reduced only to $Fe_3O_4$ is prevented from entering into the solution.

If it is desired to form a manganese nitrate solution in this extraction procedure for subsequent production of manganese dioxide by decomposition of this solution, nitric acid may be used in quantities sufficient to extract the manganese. However, other metal oxides, constituting impurities, which are soluble in acids may be dissolved at economical advantage in an inexpensive acid, for example, sulfuric acid. This procedure may be carried out in a single operation by the use of a mixture of acids in accordance with the analysis of the reduced material. Calcium, barium and lead will remain as insoluble sulfates in the insoluble remainder, together with the iron oxide, silica and aluminum oxide, while magnesium-, sodium-, and potassium-sulfates will be in the manganese nitrate solution.

In the event of the presence of greater quantities of magnesium, the adding of an equivalent quantity of calcium carbonate, at the end of the leaching operation, or later on, will cause an elimination of this element from the leach solution according to the equation:

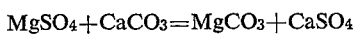

$$MgSO_4 + CaCO_3 = MgCO_3 + CaSO_4$$

The manganese nitrate solution, formed and treated in this manner, contains only a small amount of sodium- and potassium-salts, which are not decomposed at the decomposition temperature of manganese nitrate.

The manganese dioxide may be produced by decomposition of the manganese nitrate solution into nitric acid and manganese dioxide, the latter containing impurities of salts readily removable by washing the manganese dioxide produced with water.

In the foregoing description of the process, the amount of sulfuric acid used in the leaching operation is based on the amount of metal oxides forming insoluble sulfates. However, it is possible to use an amount of sulfuric acid being an equivalent to the amount of all impurities soluble in the acid. In this event, the solution formed by the leaching contains a large amount of manganese-and-nitrate ions, and a comparatively small amount of the other metal ions and sulfate-ions. Since in the decomposition of the solution only the manganese nitrate is decomposed, the other metals remain in the manganese dioxide product thus formed as sulfates, which can be removed by washing with water. Furthermore, the use of a mixture of nitric acid and sulfuric acid shows in several ores a better and faster extraction of the manganese than nitric acid alone.

Figure 2:
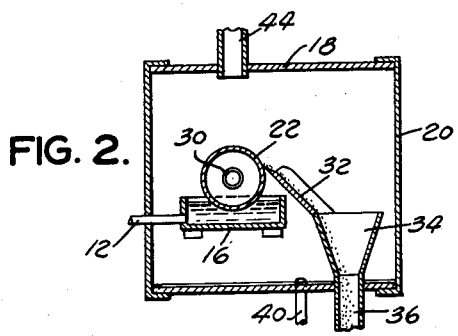
Fig. 2 is a sectional view taken on line 2—2 of Fig. 1.
Figure 3:
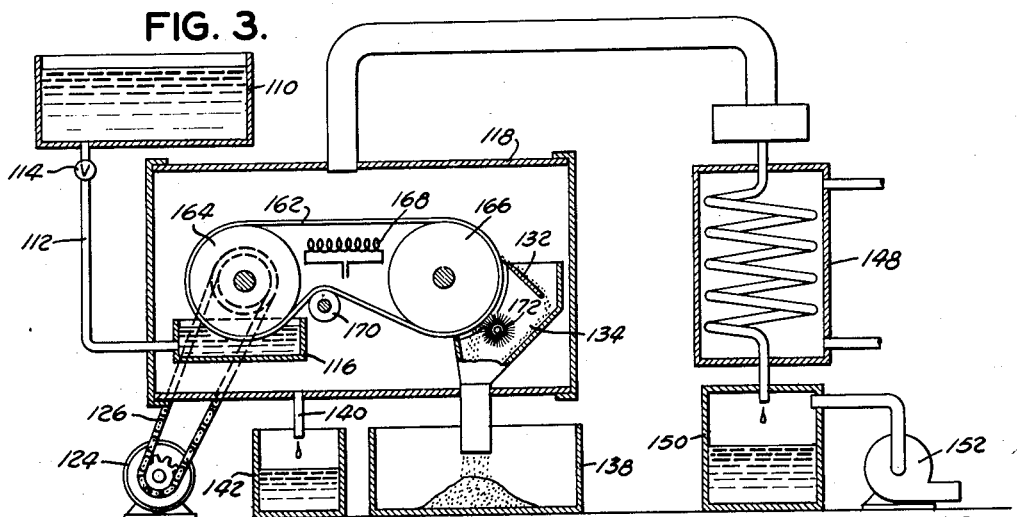
Fig. 3 is a view, partly in section, of another embodiment of an apparatus for the decomposition of the manganese nitrate solution.

The decomposition of the manganese nitrate solution may be carried out in a spray-drier or in a decomposition unit as shown in Figs. 1 and 2, and Fig. 3 respectively.

Referring now to Figs. 1 and 2:

A supply of manganese nitrate solution, after concentration thereof to a desired degree, is poured into the tank, generally indicated by 10. A pipe 12 provided with a valve 14 connects this tank 10 with a pan 16 arranged within an enclosure 18 provided with a removable cover 20. A rotatable drum 22 arranged within the enclosure 18 may be rotated by a motor 24 through the medium of a chain drive 26. The drum 22 may be heated by a heating device 28 arranged in alignment with a hollow tube 30 carrying the drum 22. The drum 22 is immersed into the manganese nitrate solution led from the tank 10 through the pipe 12 into the pan 16.

A knife 32, arranged adjacent the drum 22 in the interior of the enclosure 18 contacts the surface of the drum 22 for scraping off material collected thereon, and leading same into a funnel 34 having an outlet 36 communicating with a collecting chamber 38 arranged outside the enclosure 18.

A pipe 40 connects the interior of the enclosure 18 with a collecting tank 42, which is open at the top.

Another pipe 44 connects the interior of the enclosure 18 with a coil 46 of a condenser 48. The open end of the coil 46 communicates with the interior of a collecting tank 50, which is closed at the top. Furthermore, the intake end of a vacuum pump 52 is connected with the interior of the collecting tank 50.

The operation of the apparatus is as follows:

A continuous flow of manganese nitrate solution controlled by the setting of the valve 14 flows from the supply tank 10 through the pipe 12 into the pan 16. Air is sucked into the interior of the enclosure 18 through the pipe 40 by the action of the vacuum pump 52. The surface of the drum 22 rotated by the motor 24, and heated by the heating device 28 dips into the manganese nitrate solution present in the pan 16. As the heated drum rotates, a layer of the rather sticky solution adheres to the surface of the rotating drum 22 after leaving the supply of solution present in the pan 16.

Due to the action of heat and the presence of air sucked into the enclosure 18 by the vacuum pump 52, the layer of manganese nitrate solution adhering to the surface of the drum 22 is decomposed into solid manganese dioxide remaining on the surface of the drum 22, and into nitric acid (gas). A portion of this nitric acid is condensed into liquid form and leaves the enclosure 18 through the pipe 40 for collection in the collecting tank 42.

Another portion of the nitric acid is in the form of vapor sucked by the vacuum pump 52 from the enclosure 18 through the pipe 44 into the condenser 48, wherein it is condensed into liquid state leaving the coil 46 for collection in the collecting tank 50.

The layer of solid manganese dioxide is scraped off by the knife 32 from the surface of the rotating drum 22 and led to the funnel 34 communicating with the collecting chamber 38, wherein the manganese dioxide thus obtained is collected.

The apparatus according to the embodiment shown in Fig. 3 operates according to the same principle as the apparatus described above in connection with Figs. 1 and 2.

According to Fig. 3, a supply of the manganese nitrate solution, after concentration thereof to a considerable degree passes in a continuous flow from the supply tank 110 through the valve 114 controlled by the pipe 112 into the pan 116 arranged within the enclosure 118.

Nitric acid leaving the enclosure 118 in liquid state may be collected in the collecting tank 142. Nitric acid leaving the enclosure 118 as vapor may be collected in the collecting tank 150 after condensation in the condenser 148. The vacuum pump 152 on the one hand sucks fresh air into the enclosure 118 through the pipe 140, and on the other hand removes the vapors containing nitric acid from the interior of the enclosure 118.

However, instead of a heated drum dipping into the manganese nitrate solution, an endless steel band 162 trained around pulleys 164, 166, and heated by an electric heating device 168 is used for picking up a layer of the solution. The pulley 164 is driven by a motor 124 through the medium of a chain drive 126. A tensioning roller 170 engaged with the steel band 162 serves for tensioning same.

During the operation of the apparatus, the steel band 162 moved by the driven pulley 164 dips into the supply of manganese nitrate solution present in the pan 116. The layer of the solution adhering to the surface of the steel band 162 is decomposed by the action of the heat in the presence of air into nitric acid and solid manganese dioxide, the latter adhering to the surface of the steel band 162, and being scraped off therefrom by the knife 132. This knife leads the manganese dioxide into the funnel 134 for removal into the collecting chamber 138. After engagement with the knife 132 the surface of the steel band 162 is cleaned by the brush 172 which may be rotated. The brush 172 is arranged in the funnel 134 so that particles removed by the brush from the surface of the steel band 162 drop into the funnel, and thence reach the collecting chamber 138.

The process according to the invention will now be described by several examples, but it should be understood that these examples are given by way of illustration rather than by way of limitation, and that many variations may be made in the selection of the starting material, the mode of operation, the reducing agents, the temperature, the time of reaction, etc., without departing in any way from the spirit of the invention.

*Example I*

A head sample of an ore containing 12.9% Mn, 28.2% Fe, 26% $SiO_2$, .9% CaO, 1.2% MgO, and .076% P, finely ground, is incompletely reduced in city-gas atmosphere at a temperature of 530° C. for a period of one hour, to a product containing $Fe_3O_4$ and manganese oxides composed of $Mn_2O_3$ and MnO. One pound of the incompletely reduced products is leached with 155 ml. nitric acid (68%) and 350 ml. water, until the pH value remains constant at 3. Then, the leach, representing a manganese nitrate solution is filtered from the insoluble remainder. An analysis of the leach showed that 85.6% of the manganese content of the head sample was found in the solution, but no iron and no phosphorus. The manganese nitrate solution may be treated in any suitable chemical way to form a manganese oxide. For example, a manganese nitrate solution may be decomposed at 200° C. in the presence of air yielding a manganese dioxide product and nitric acid. The insoluble remainder is dried and pulverized whereupon the $Fe_3O_4$ component is extracted by means of a magnet. Thus, a product containing 52% Fe is obtained, the ratio of recovery of the iron in relation to the head sample being 80%. If desired, however, a wet magnetic separation of the $Fe_3O_4$ from the insoluble remainder can be carried out.

*Example II*

A head sample of an ore containing 12.9% Mn., 28.2% Fe., 26% $SiO_2$, .9% CaO, 1.2% MgO. and .076% P, finely ground, is incompletely reduced in city-gas atmosphere at a temperature of 530° C. for a period of one hour, to a product containing $Fe_3O_4$ and manganese oxides composed of $Mn_2O_3$ and MnO. One pound of the incompletely reduced product is leached with 155 ml. nitric acid (68%) and 350 ml. water until the pH value remains constant at 3. Then, the leach thus obtained, representing a manganese nitrate solution is filtered from the insoluble remainder. An amount of 155 ml. nitric acid (68%) is admixed to the manganese nitrate solution obtained by the filtering step mentioned above whereby an acid salt solution is obtained. Thereafter, another portion of the incompletely reduced product, again one pound thereof, is leached with the acid salt solution containing a mixture of the manganese nitrate solution obtained by the previous step and nitric acid until the pH value remains constant at 3. Then, the second leach thus obtained, representing a manganese nitrate solution of higher concentration is filtered from the insoluble remainder. 84.2% of the manganese content of the head sample is recovered in the solution, while all of the phosphorus and iron remains in the insoluble remainder. The manganese nitrate solution may be treated in any suitable chemical way to form a manganese oxide. For example, a manganese nitrate solution may be decomposed at 200° C. in the presence of air yielding a manganese dioxide product and nitric acid. The insoluble remainder is dried and pulverized, whereupon the $Fe_3O_4$ component is extracted by means of a magnet. Thus, a product containing 52% Fe is obtained, the ratio of recovery of the iron in relation to the head sample being 80%. If desired, however, a wet magnetic separation of the $Fe_3O_4$ from the insoluble remainder can be carried out.

*Example III*

A head sample of an ore containing 12.9% Mn, 28.2% Fe, 26% $SiO_2$, .9% CaO, 1.2% MgO, and .076% P, finely ground, is incompletely reduced in city-gas atmosphere at a temperature of 530° C. for a period of one hour to a product containing $Fe_3O_4$ and manganese oxides composed of $Mn_2O_3$ and MnO. One pound of the incompletely reduced product is leached with 65 ml. sulfuric acid (66° Bé.) and 450 ml. water until the pH value remains constant at 3. Then the manganese sulfate solution thus obtained is filtered from the insoluble remainder. 82% of the manganese content of the head sample may be found in the solution, but no substantial amount of iron and phosphorus.

The manganese sulfate solution may be treated in any suitable chemical way to form a manganese oxide. Furthermore, if desired, the manganese sulfate solution may be treated electrolytically so as to form a manganese metal. The insoluble remainder is dried and pulverized, whereupon the $Fe_3O_4$ component is extracted by means of a magnet. Thus, a product containing 52% Fe is obtained, the ratio of recovery of the iron in relation to the head sample being 80%. If desired, however, a wet magnetic separation of the $Fe_3O_4$ from the insoluble remainder can be carried out.

*Example IV*

A head sample of an ore containing 12.9% Mn, 28.2% Fe, 26% $SiO_2$, .9% CaO, 1.2% MgO, and .076% P, finely ground, is incompletely reduced in city-gas atmosphere at a temperature of 530° C. for a period of one hour to a product containing $Fe_3O_4$ and manganese oxides composed of $Mn_2O_3$ and MnO. One pound of the incompletely reduced product is leached with 210 ml. hydrochloric acid (36% HCl) and 300 ml. water until the pH value remains constant at 3. Then, the manganese chloride solution thus obtained is filtered from the insoluble remainder. 90% of the manganese content of the head sample may be found in the solution, but no substantial amount of iron and phosphorus.

The manganese chloride solution may be treated in any suitable chemical way to form a manganese oxide. The insoluble remainder is dried and pulverized, whereupon the $Fe_3O_4$ component is extracted by means of a magnet. Thus, a product containing 52% Fe is obtained, the ratio of recovery of the iron in relation to the head sample being 80%. If desired, however, a wet magnetic separation of the $Fe_3O_4$ from the insoluble remainder can be carried out.

*Example V*

A head sample of an ore containing 12.9% Mn, 28.2% Fe, 26% $SiO_2$, .9% CaO, 1.2% MgO, and .076% P, finely ground, is incompletely reduced in city-gas atmosphere at a temperature of 530° C. for a period of one hour to a product containing $Fe_3O_4$ and manganese oxides composed of $Mn_2O_3$ and MnO. One pound of the incompletely reduced product is leached with an acid in the manner set forth in Examples I, III, or IV, or with an acid solution set forth in Example II. The manganese salt solution thus obtained may be treated in the same manner as set forth in Examples I to IV.

However, in contrast to Examples I to IV, the $Fe_3O_4$ component is removed by magnetic separation from the reduced product between the reduction step and the leaching step. In this case the ratio of recovery of iron and manganese in relation to the head sample amounts only to 41% with respect to iron and to 64% with respect to manganese, as a substantial percentage of the manganese remains in the fraction removed by magnetic separation.

*Example VI*

A head sample of an ore containing 27.7% Mn, 6.3% Fe, 4.75% CaO, 3.24% MgO, 11% $SiO_2$ and 4.6% $Al_2O_3$, finely ground is incompletely reduced in a city-gas atmosphere at a temperature of 600° C. for one hour, to a product containing $Fe_3O_4$ and manganese oxides composed of $Mn_2O_3$ and MnO. One pound of the incompletely reduced product is leached with a mixture of diluted nitric acid and sulfuric acid composed of 300 ml. nitric acid (68%) 45 ml. sulfuric acid (66° Bé.) and 160 ml. water. The leached solution thus formed, contains manganese and magnesium, and a very small portion of calcium, the greater portion of the latter being left as calcium sulfate in the remainder, together with the iron, the silica, and the aluminum oxide.

In order to remove the magnesium from this leached solution, and to transfer the same into the insoluble remainder, one-tenth of a pound of calcium carbonate is added to the leach at the end of the leaching operation, and the mixture is stirred for one hour.

The manganese nitrate solution thus formed by the leaching operation is filtered from the insoluble remainder. This manganese nitrate solution, containing 92% of the manganese content of the head sample, and only very small amounts of impurities is decomposed at a temperature of 200° C. into a manganese dioxide product with 60% manganese and a nitric acid containing 50% $HNO_3$.

The $Fe_3O_4$ component may be recovered by magnetic separation in the manner set out in Examples I and V.

I have described preferred embodiments of my invention, but it is understood that various changes may be made without departing from the spirit and scope of the invention as set forth in the appended claims.

What I claim is:

1. A process for the separation of manganese from iron and other undesirable minerals of an ore, comprising the steps of: subjecting a finely ground ore containing manganese and iron to a selective reducing treatment with a carbonaceous reducing agent, the composition and temperature of said reducing agent and the treatment time being selected in such a manner that an incompletely reduced product is obtained containing the manganese values in the form of $Mn_2O_3$ and MnO and the iron values in oxide form not lower than $Fe_3O_4$, leaching said reduced product with an acid solution selected from the group consisting of nitric acid, sulfuric acid and hydrochloric acid until a substantially constant pH value of about 2–5 is obtained, whereby a leach is obtained containing a manganese salt solution and an insoluble remainder containing the iron oxide together with the gangue material, and separating said manganese salt solution from said insoluble remainder.

2. A process for the separation of manganese from iron and other undesirable minerals of an ore, comprising the steps of: subjecting a finely ground ore containing manganese and iron to a selective reducing treatment with a carbonaceous reducing agent, the composition and temperature of said reducing agent and the treatment time being selected in such a manner that an incompletely reduced product is obtained containing the manganese values in the form of $Mn_2O_3$ and MnO and the iron values in oxide form not lower than $Fe_3O_4$, leaching said reduced product with nitric acid until a substantially constant pH value of about 2–5 is obtained, whereby a leach is obtained containing a manganese nitrate solution and an insoluble remainder, said remainder containing the iron oxide together with the gangue material, and separating said manganese nitrate solution from said insoluble remainder.

3. A process for the separation of manganese from iron and other undesirable minerals of an ore, comprising the steps of: subjecting a finely ground ore containing manganese and iron to a selective reducing treatment with a carbonaceous reducing agent, the composition and temperature of the reducing agent and the treatment time being selected in such a manner that an incompletely reduced product is obtained containing the manganese values in the form of $Mn_2O_3$ and $MnO$ and the iron values in oxide form not lower than $Fe_3O_4$, leaching said reduced product with nitric acid until a substantially constant pH value of about 2–5 is obtained, whereby a leach is obtained containing a manganese nitrate solution and an insoluble remainder, said remainder containing the iron oxide together with the gangue material separating said manganese nitrate solution from said insoluble remainder, and splitting said manganese nitrate solution at an elevated temperature into manganese dioxide and nitric acid.

4. A process for the separation of manganese from iron and other undesirable minerals of an ore, comprising the steps of: subjecting a finely ground ore containing manganese and iron to a selective reducing treatment with a carbonaceous reducing agent, the composition and temperature of the reducing agent and the treatment time being selected in such a manner that an incompletely reduced product is obtained containing the manganese values in the form of $Mn_2O_3$ and $MnO$ and the iron values in oxide form not lower than $Fe_3O_4$, leaching said reduced product with an acid solution selected from the group consisting of nitric acid, sulfuric acid and hydrochloric acid until a substantially constant pH value of about 2–5 is obtained, whereby a leach is obtained containing a manganese salt solution and an insoluble remainder, said remainder containing the iron oxide together with the gangue material, and separating said manganese salt solution from said insoluble remainder, and removing $Fe_3O_4$ from said insoluble remainder by magnetic separation.

5. A process for the separation of manganese from iron and other undesirable minerals of an ore, comprising the steps of: subjecting a finely ground ore containing manganese and iron to a selective reducing treatment with a carbonaceous reducing agent, the composition and temperature of said reducing agent and the treatment time being selected in such a manner that an incompletely reduced product is obtained containing the manganese values in the form of $Mn_2O_3$ and $MnO$ and the iron values in oxide form not lower than $Fe_3O_4$, leaching said reduced product with sulfuric acid until a substantially constant pH value of about 2–5 is obtained, whereby a leach is obtained containing a manganese sulfate solution and an insoluble remainder, said remainder constaining the iron oxide together with the gangue material, and separating said manganese sulfate solution from said insoluble remainder.

6. A process for the separation of manganese from iron and other undesirable minerals of an ore, comprising the steps of: subjecting a finely ground ore containing manganese and iron to a selective reducing treatment with a carbonaceous reducing agent, the composition and temperature of said reducing agent and the treatment time being selected in such a manner that an incompletely reduced product is obtained containing the manganese values in the form of $Mn_2O_3$ and $MnO$ and the iron values in oxide form not lower than $Fe_3O_4$, leaching said reduced product with hydrochloric acid until a substantially constant pH value of about 2–5 is obtained, whereby a leach is obtained containing a manganese chloride solution and an insoluble remainder, said remainder containing the iron oxide together with the gangue material, and separating said manganese chloride solution from said insoluble remainder.

7. A process for the separation of manganese from iron and other undesirable minerals of an ore, comprising the steps of: subjecting a finely ground ore containing manganese and iron to a selective reducing treatment with a carbonaceous reducing agent, the composition and temperature of said reducing agent and the treatment time being selected in such a manner that an incompletely reduced product is obtained containing the manganese values in the form of $Mn_2O_3$ and $MnO$ and the iron values in oxide form not lower than $Fe_3O_4$, leaching said reduced product with a mixture of nitric acid and sulfuric acid until a substantially constant pH value of about 2–5 is obtained, whereby a leach is obtained containing a manganese salt solution and an insoluble remainder, said remainder containing the iron oxide together with the gangue material, and separating said manganese salt solution from said insoluble remainder.

References Cited in the file of this patent

UNITED STATES PATENTS

| Number | Name | Date |
|---|---|---|
| 654,393 | Handy | July 24, 1900 |
| 690,126 | Weddell | Dec. 31, 1901 |
| 1,403,237 | Eustis | Jan. 10, 1922 |
| 1,761,133 | Laury | June 3, 1930 |
| 1,835,474 | DeWitt | Dec. 8, 1931 |
| 1,918,377 | Buchner | July 18, 1933 |
| 1,932,413 | Laury | Oct. 31, 1933 |
| 1,937,508 | Bradley | Dec. 5, 1933 |
| 1,951,342 | Bradley et al. | Mar. 20, 1934 |
| 2,059,499 | Sweet | Nov. 3, 1936 |
| 2,070,496 | Sweet | Feb. 9, 1937 |
| 2,074,013 | Bradley | Mar. 6, 1937 |
| 2,255,539 | Clarkson | Sept. 9, 1941 |
| 2,262,185 | Jacobs | Nov. 11, 1941 |
| 2,339,793 | Moecklebust | Jan. 25, 1944 |
| 2,344,004 | Six | Mar. 14, 1944 |
| 2,370,415 | Pine | Feb. 27, 1945 |
| 2,374,674 | Fox et al. | May 1, 1945 |
| 2,397,824 | Wanamaker | Apr. 2, 1946 |
| 2,462,499 | Hoak | Feb. 22, 1949 |

OTHER REFERENCES

Treadwell and Hall: "Qualitative Analysis," John Wiley, New York, 1930, vol. I, page 458.

Mellor: "Comprehensive Treatise on Inorganic and Theoretical Chemistry," volume IV, pages 358–359, Longmans, Green and Co., New York, 1923.

Taggart: "Handbook of Mineral Dressing," J. Wiley and Sons Inc., New York, 1945, section 2, pages 2–108, 2–109.

Dean, Fox and Beck: R. I. 3626 U. S. Dept. of Interior, Bureau of Mines, March 1942. Manganese Investigations. Metallurgical Division. Hydrometallurgical Studies of Manganese Ores, pages 5, 6, 10, 11.